United States Patent Office 3,576,837
Patented Apr. 27, 1971

3,576,837
PROCESS FOR PREPARATION OF BIS(TRIFLUOROMETHYL) TRIOXIDE AND FLUOROFORMYL TRIFLUOROMETHYL PEROXIDE
Lowell Ray Anderson, Parsippany, and William B. Fox, Morristown, N.J., assignors to Allied Chemical Corporation, New York, N.Y.
No Drawing. Filed Aug. 22, 1968, Ser. No. 754,725
Int. Cl. *C07c 73/00, 73/10*
U.S. Cl. 260—453                                            8 Claims

ABSTRACT OF THE DISCLOSURE

Bis(trifluoromethyl) trioxide and fluoroformyl trifluoromethyl peroxide may be prepared by reacting carbonyl fluoride and difluoromethylene bis(oxyfluoride) in the presence of CsF or RbF. With reaction times below about six hours fluoroformyl trifluoromethyl peroxide is recovered to the exclusion of any appreciable quantity of bis(trifluoromethyl) trioxides. With reaction times above about 18 hours, bis(trifluoromethyl) trioxide is recovered to the exclusion of any appreciable quantity of fluoroformyl trifluoromethyl peroxide.

BACKGROUND OF THE INVENTION

Bis(trifluoromethyl) trioxide, $CF_3OOOCF_3$, is a known compound and under standard conditions is a colorless gas having a freezing point of about $-138°$ C. and a boiling point of about $-16°$ C. $CF_3OOOCF_3$ has been prepared by the photolysis of equimolar amounts of hexafluoroazomethane ($CF_3N=NCF_3$') and oxygen. (See V. A. Ginsburg et al., Photoreactions of Hexafluoroazomethane With Unsaturated Compounds, Doklady Akademii Nauk SSSR, vol. 149, No. 1, pages 97–99, March-April 1963.)

$CF_3OOOCF_3$ is a useful intermediate, particularly for the preparation of bis(trifluoromethyl peroxide, $CF_3OOCF_3$, which in turn is known to be useful as an initiator for the polymerization of ethylenically unsaturated compounds (c.f. U.S.P.'s 3,069,404 and 3,202,718).

Unfortunately, $CF_3N=NCF_3$, previously known starting material for the synthesis of $CF_3OOOCF_3$, is an exotic compound which is not commercially available and is difficult and costly to prepare.

It is accordingly an object of this invention to provide an improved process for the preparation of $CF_3OOOCF_3$.

A more particular object of the invention is to provide a method for preparing $CF_3OOOCF_3$ from simple, inexpensive and commercially available raw materials.

Fluoroformyl trifluoromethyl peroxide, $CF_3OOC(O)F$, is a known compound and under standard conditions, is a colorless gas having a boiling point of about $-10°$ C. $CF_3OOC(O)F$ has been prepared by the reaction of $FC(O)OOC(O)F$ with either difluorocarbene or fluorine, under photolytic conditions. Both of these methods suffer from the use of $FC(O)OOC(O)F$ as starting material. This starting material is rather unstable and is difficult to handle. Moreover, these processes suffer from the disadvantage of the requirement for photochemical activation.

$CF_3OOC(O)F$ may be used in a conventional manner, as a curing and cross linking agent in the polymerization of ethylenically unsaturated materials and also as an initiator for the polymerization of ethylenically unsaturated compounds in the same manner described in U.S.P.'s 3,069,404 and 3,202,718 mentioned supra.

It is accordingly another object of this invention to provide an improved process for the preparation of $CF_3OOC(O)F$.

Another more particular object of the invention is to provide a method for preparing $CF_3OOC(O)F$ from stable, easy to handle raw materials without the need to resort to photochemical activation.

Other objects and advantages of the invention will be apparent from the following description.

SUMMARY OF THE INVENTION

It has been found that the objects of the invention may be accomplished by reacting carbonyl fluoride, $COF_2$, with difluoromethylene bis(oxyfluoride), $CF_2(OF)_2$, in the presence of CsF or RbF. With short reaction periods, say in the order of about six hours or below, $CF_3OOC(O)F_3$. With longer reaction times in the order of about eighteen hours and above, $CF_3OOOCF_3$ is recovered as product to the exclusion of any appreciable amounts of $CF_3OOC(O)F$. Reaction periods between six and eighteen hours will result in product mixtures containing both $CF_3OOC(O)F$ and $CF_3OOOCF_3$ products in varying amounts.

DETAILED DESCRIPTION OF THE INVENTION AND THE PREFERRED EMBODIMENTS

The $COF_2$ reactant is a well known commercially available material.

The $CF_2(OF)_2$ reactant is also well known and can easily be prepared in essentially quantitative yields by the reaction of $CO_2$ and $F_2$ over CsF at $-80°$ C. It can be seen, therefore, that the subject procedure involves use of only relatively inexpensive and easily obtainable raw materials, viz $CO_2$, $F_2$, $COF_2$ and an alkali metal fluoride.

The preferred catalyst is CsF. Preferably, the catalyst is activated prior to use by grinding or by other treatment designed to increase surface area.

Reaction temperatures are not absolutely critical. Unduly low temperatures, however, result in unduly low reaction rates and high temperatures do not favorably influence the reactions. Moreover, since $CF_3OOOCF_3$ decomposes above about 70° C., when $CF_3OOOCF_3$ is the desired product, temperatures above that level should be avoided. It should be pointed out, however, that the decomposition of $CF_3OOOCF_3$ is a method employed to produce the useful $CF_3OOCF_3$ so that if the latter material is desired as product, it can be produced in one step by the subject method by the use of temperatures above about 70° C. The subject reaction does proceed quite readily at room temperature, i.e. about 25° C. and accordingly, for reasons of convenience, room temperature is preferred.

The molar proportion of the $COF_2$ and $CF_2(OF)_2$ reactants are not critical and may be varied over a wide range. For reasons of economy and convenience, it is preferable to use stoichiometric amounts of the reactants, i.e. two moles of COF to one mole of $CF_2(OF)_2$. Large excesses of one or the other reactants will not deleteriously affect the reaction and it has been found, as is illustrated in the appended examples, that good yields of either of the subject products are obtained when approximately equimolar proportions of the reactants are employed.

The reaction will proceed under atmospheric, superatmospheric or subatmospheric pressures. Due to the fact that the reactants and products are all gases, it is advantageous to employ standard vacuum techniques in order to facilitate handling and measurement of the gaseous materials.

When vacuum equipment is employed, the reactor may be provided with reactor charging equipment which may include a valved outlet which facilitates sealing off the reactor and alternative opening of the same to afford connection of the reaction zone with a high vacuum suction conduit, which in turn may have associated therewith various cold traps. The reactor will be sealed off during the reaction and thus the reaction will proceed under the autogenous pressure developed in the system.

The optimum reaction periods for the $COF_2$ and $CF_2(OF)_2$ reactants in the reactor are dependent, as indicated above, on the particular product desired and to a lesser extent on such variables as reaction temperature, yield desired, catalyst, state of activation of the catalyst, and size of the operation. With reaction periods of less than about six hours, as noted above, the $CF_3OOC(O)F$ product is favored. Some yields of this product will be produced with reaction periods below one hour, but generally a reaction period of at least one hour is needed in order to get significant yields of product. The optimum reaction period which should be employed if $$CF_3OOC(O)F$$

is the desired product generally lies between about 2–3 hours. If $CF_3OOOCF_3$ is the desired product, as noted above, reaction periods, of at least about 18 hours should be employed. The preferred reaction periods for optimizing yields of $CF_3OOOCF_3$ lie between about 24–36 hours. Use of reaction periods substantially above 36 hours will not deleteriously affect the reaction. With reaction periods between 6 and 18 hours, the product mixture will consist of both $CF_3OOC(O)F$ and $CF_3OOOCF_3$ products in varying amounts.

A valuable major by-product of the reaction is trifluoromethyl hypofluorite, $CF_3OF$, a known material.

The crude $CF_3OOC(O)F$ and $CF_3OOOCF_3$ products may be utilized as such, or if desired, they may first be purified by vacuum line fractionation through cold traps maintained at appropriate temperatures. For good results, a first trap maintained at $-196°$ C. is employed to trap all condensible components of the product mixture and to permit non-condensibles such as oxygen, to be removed. The product mixture thus collected is then vaporized and passed through a trap maintained at about $-142°$ C. to $-145°$ C. to collect $CF_3OOOCF_3$ product or at about $-130°$ C. to collect $CF_3OOC(O)F$ product. The products obtained by such fractionation techniques are essentially pure.

Yields of the $CF_3OOC(O)F$ product can be improved by reintroducing the material passing through the $-130°$ C. or $-142$ to $-145°$ C. trap onto the catalyst and repeating the reaction.

The following examples illustrate practice of the invention.

Details given are illustrative only and are not intended to constitute limitations upon the invention.

Example 1

A quantity of CsF was dried in vacuo at 160° C. and then activated by grinding for five (5) hours in a Spex Mixer/Mill Model 8000 using a tungsten carbide capsule and ball. Approximately two (2) g. of the activated CsF were introduced into a small glass reaction tube of about 30 ml. capacity. The reaction tube was then capped and equipped with a valve. Standard vacuum techniques were used to measure and condense equimolar amounts (1.9 mmoles) of purified $COF_2$ and $F_2C(OF)_2$ through the valve into the reaction tube. The reaction tube valve was then closed, and the contents allowed to warm to room temperature and then remain at that temperature overnight. The total reaction period was about eighteen (18) hours. At the end of this period, the gases above the CsF catalyst were pumped through a $-196°$ C. trap. This allowed removal of oxygen formed in the reaction. The condensible materials were then fractionated through a $-142°$ C. trap. The material passing through the $-142°$ C. trap was identified by its infrared spectrum to be the known compound $CF_3OF$. The material retained in the $-142°$ C. trap had a boiling point of $-16°$ C. and was identified by means of its infrared spectrum as being the known compound $CF_3OOOCF_3$. The $CF_3OOOCF_3$ product was obtained in a yield of approximately 20%. There was no evidence of the presence of $CF_3OOC(O)F$.

Example 2

The procedure of Example 1 is repeated with 1.9 mmoles each of the reactants, excepting that RbF is employed as the catalyst. The yield of $CF_3OOOCF_3$ obtained is of the same order reported in Example 1 for a corresponding reaction period.

Example 3

The procedure of Example 1 was repeated with the following exceptions: 5.0 mmoles each of the reactants were charged to a stainless steel reaction tube. The reaction tube contents were fractionated between a $-196°$ C. trap and a $-130°$ C. trap after a reaction period of only three hours at room temperature. The material retained in the $-130°$ C. trap had a boiling point of $-10°$ C. and was identified as being essentially pure $$CF_3OOC(O)F$$

as confirmed by elemental and infrared analyses.

Example 4

The procedure of Example 3 is repeated excepting that RbF is employed as a catalyst. The yield of $CF_3OOC(O)F$ obtained is of the same order reported in Example 3 for a corresponding reaction period.

Example 5

The procedure of Example 3 is repeated excepting that the reaction period is 2½ hours. The product obtained is $CF_3OOC(O)F$ and there is no evidence of the presence of $CF_3OOOCF_3$.

Example 6

The procedure of Example 3 is repeated excepting that the reaction period was one hour. The product obtained is $CF_3OOC(O)F$ and there is no evidence of the presence of $CF_3OOOCF_3$.

We claim:
1. A process for preparing $CF_3OOC(O)F$, which process comprises reacting $COF_2$ with $CF_2(OF)_2$ in the presence of CsF or RbF, the reaction period being less than about 6 hours.
2. The process of claim 1 in which the reaction is carried out at temperatures between about 0–70° C.
3. The process of claim 2 wherein the reaction period is between about 2–3 hours.
4. A process for preparing mixtures of $CF_3OOC(O)F$ and $CF_3OOOCF_3$, which process comprises reacting $COF_2$ with $CF_2(OF)_2$ in the presence of CsF or RbF, the reaction period being between about 6–18 hours.
5. The process of claim 4 in which the reaction is carried out at temperatures between about 0–70° C.
6. A process for preparing $CF_3OOOCF_3$, which process comprises reacting $COF_2$ with $CF_2(OF)_2$ in the presence of CsF or RbF, the reaction period being at least about 18 hours.
7. The process of claim 6 in which the reaction is carried out at temperatures between about 0–70° C.
8. The process of claim 7 wherein the reaction period is between about 24–36 hours.

References Cited

UNITED STATES PATENTS 3,415,865  12/1968  Prager et al. _____ 260—453
3,436,424   4/1969  Anderson et al. _____ 260—610

LEWIS GOTTS, Primary Examiner

D. G. RIVERS, Assistant Examiner

U.S. Cl. X.R.
260—610